United States Patent
Green, III

(10) Patent No.: US 9,457,961 B2
(45) Date of Patent: Oct. 4, 2016

(54) PRE-ANGLING OF ARTICLES FOR SORTATION

(71) Applicant: Dematic Corp., Grand Rapids, MI (US)

(72) Inventor: Thomas H. Green, III, Wyoming, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 14/687,072

(22) Filed: Apr. 15, 2015

(65) Prior Publication Data

US 2015/0298917 A1    Oct. 22, 2015

Related U.S. Application Data

(60) Provisional application No. 61/980,232, filed on Apr. 16, 2014.

(51) Int. Cl.
*B65G 47/14* (2006.01)
*B65G 47/46* (2006.01)
*B65G 47/244* (2006.01)
*B65G 47/84* (2006.01)

(52) U.S. Cl.
CPC .......... *B65G 47/244* (2013.01); *B65G 47/844* (2013.01); *B65G 2207/36* (2013.01)

(58) Field of Classification Search
CPC ..... B65G 47/14; B65G 47/244; B65G 47/46
USPC .......... 198/370.01, 370.02, 370.07, 374, 452
See application file for complete search history.

(56) References Cited

U.S. PATENT DOCUMENTS

| | | | |
|---|---|---|---|
| 3,508,640 A | 4/1970 | De Good et al. | |
| 4,598,815 A * | 7/1986 | Adama | B65G 13/10 198/370.09 |
| 4,682,682 A * | 7/1987 | Hartlepp | B65G 47/244 198/368 |
| 4,738,347 A | 4/1988 | Brouwer et al. | |
| 4,915,209 A * | 4/1990 | Canziani | B65G 43/08 198/357 |
| 5,127,510 A | 7/1992 | Cotter et al. | |

(Continued)

FOREIGN PATENT DOCUMENTS

CA    2705515 A1    5/2009

OTHER PUBLICATIONS

International Search Report and Written Opinion of the International Searching Authority from corresponding Patent Cooperation Treaty (PCT) Application No. PCT/US2015/025886, mailed Jul. 10, 2015.

*Primary Examiner* — Douglas Hess
(74) *Attorney, Agent, or Firm* — Gardner, Linn, Burkhart & Flory, LLP

(57)    ABSTRACT

A method of sorting articles using a positive displacement sorter having a plurality of slats arranged in parallel to define a conveying surface moving in a longitudinal direction, a plurality of pusher shoes, each of said shoes travelling laterally along at least one of said slat and a diverting station comprising at least one diverting rail arranged diagonally under said conveying surface and at least one diverting switch for selectively diverting at least two pusher shoes to the diverting rail whereby the pusher shoes travel laterally across said conveying surface in a diagonal path in order to divert an article to a take-away lane includes pre-orienting articles prior to the diverting station wherein a side of each article is oriented at approximately a same orientation as the diagonal path and operating the at least one diverting switch and diverting at least one article that is pre-oriented.

16 Claims, 2 Drawing Sheets

(56) References Cited

U.S. PATENT DOCUMENTS

| | | |
|---|---|---|
| 5,165,515 A | 11/1992 | Nitschke et al. |
| 5,285,886 A | 2/1994 | Ostholt, Rudiger et al. |
| 5,664,661 A | 9/1997 | Maier |
| 5,732,814 A | 3/1998 | Owczarzak et al. |
| 5,735,388 A | 4/1998 | Brouwer |
| 5,927,465 A | 7/1999 | Shearer, Jr. |
| 6,041,909 A | 3/2000 | Shearer, Jr. |
| 6,513,642 B1 | 2/2003 | Shearer, Jr. et al. |
| 6,694,220 B1 | 2/2004 | Tanz |
| 6,814,216 B2 | 11/2004 | Veit et al. |
| 6,860,383 B2 | 3/2005 | Veit et al. |
| 6,866,136 B2 | 3/2005 | Veit et al. |
| 6,923,308 B2 | 8/2005 | Veit |
| 6,935,483 B2 | 8/2005 | Veit et al. |
| 6,951,274 B2 | 10/2005 | Zeitler et al. |
| 7,240,781 B2 | 7/2007 | Ramaker et al. |
| 7,357,242 B2 * | 4/2008 | Enomoto .............. B65G 47/844 198/370.01 |
| 7,383,936 B2 * | 6/2008 | Enomoto .............. B65G 47/844 198/370.02 |
| 7,422,098 B2 * | 9/2008 | Bonham .............. B65G 47/52 198/370.02 |
| 7,497,316 B2 * | 3/2009 | Hysell ................ B65G 47/844 198/370.02 |
| 7,779,986 B2 * | 8/2010 | Enomoto .............. B65G 47/844 198/370.02 |
| 8,167,111 B2 * | 5/2012 | Asman ................ B65G 43/08 198/349.95 |
| 8,469,177 B2 * | 6/2013 | Steenwyk ............ B65G 47/844 198/370.02 |
| 9,038,809 B2 * | 5/2015 | Wilkins ................ B65G 47/46 198/370.02 |
| 2003/0221935 A1 | 12/2003 | Barklin et al. |
| 2005/0023108 A1 | 2/2005 | Verploegen et al. |
| 2005/0133345 A1 | 6/2005 | Veit et al. |
| 2005/0167240 A1 | 8/2005 | Veit et al. |

\* cited by examiner

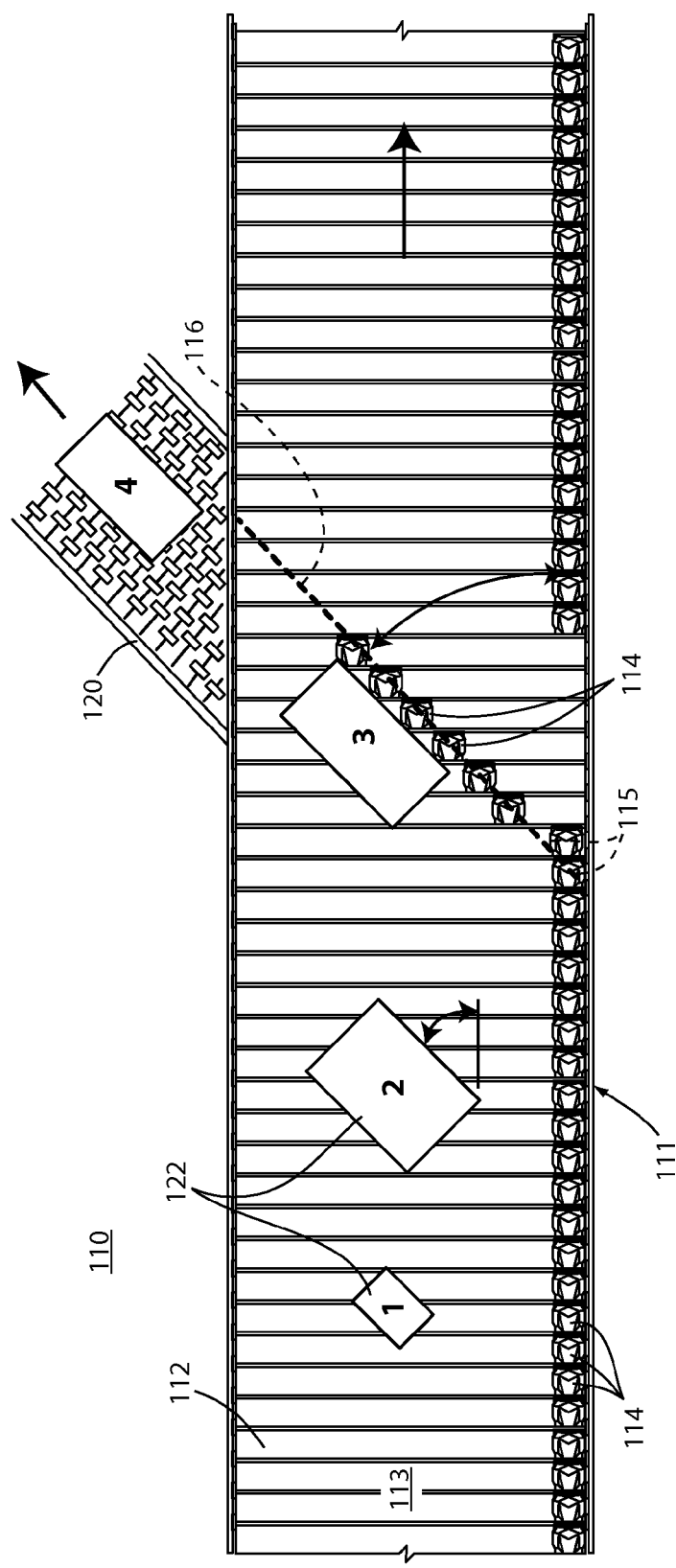

PRE-ANGLING OF ARTICLES FOR SORTATION

CROSS REFERENCE TO RELATED APPLICATION

This application claims priority from U.S. patent application Ser. No. 61/980,232, filed on Apr. 16, 2014, the disclosure of which is hereby incorporated herein by reference.

BACKGROUND OF THE INVENTION

The present invention is directed to a method and apparatus for sorting articles. The present invention is illustrated for use with a positive displacement sorter, but may find application in other types of sorters.

A positive displacement sorter has a plurality of slats arranged in parallel to define a conveying surface moving in a longitudinal direction. A plurality of pusher shoes each travel laterally along at least one slat to divert an article. A diverting station includes at least one diverting rail that is arranged diagonally under the conveying surface and at least one diverting switch for selectively diverting at least two pusher shoes to the diverting rail. The pusher shoes travel laterally across said conveying surface in a diagonal path in order to divert an article to a take-away lane.

SUMMARY OF THE INVENTION

The present invention provides an improved technique for sortation, particularly for use with diagonal sortation using a positive displacement sorter, such as a shoe-and-slat sorter.

A method of sorting articles using a positive displacement sorter having a plurality of slats arranged in parallel to define a conveying surface moving in a longitudinal direction, a plurality of pusher shoes, travelling laterally along at least one slat and a diverting station including at least one diverting rail arranged diagonally under the conveying surface and at least one diverting switch for selectively diverting pusher shoes to the diverting rail whereby the pusher shoes travel laterally across said conveying surface in a diagonal path in order to divert an article to a take-away lane, according to an aspect of the invention, includes pre-orienting articles prior to the diverting station wherein a side of each article is oriented at approximately a same orientation as the diagonal path. The at least one diverting switch is operated and at least one article that is pre-oriented is diverted.

A method of sorting articles using a positive displacement sorter having a plurality of slats arranged in parallel to define a conveying surface moving in a longitudinal direction, a plurality of pusher shoes, travelling laterally along at least one slat and a diverting station including at least one diverting rail arranged diagonally under the conveying surface and at least one diverting switch for selectively diverting pusher shoes to the diverting rail whereby pusher shoes travel laterally across the conveying surface in a diagonal path in order to divert an article to a take-away lane, according to an aspect of the invention, includes orienting articles travelling on the conveying surface prior to the diverting station wherein a side of each article is oriented in a different orientation at an angle to the longitudinal direction and operating the diverting switch and diverting an article that is oriented at the different orientation with pusher shoes engaging the side that is oriented at a different orientation.

The orienting may include changing orientation of articles from an initial orientation wherein the side of each article is oriented in the longitudinal direction to the different orientation. The orienting may be carried out prior to articles arriving on the slats. The orienting may include orienting a side of each article at an angle to the longitudinal direction that is approximately a same angle as the diagonal diverting path.

These and other objects, advantages and features of this invention will become apparent upon review of the following specification in conjunction with the drawings.

BRIEF DESCRIPTION OF THE DRAWINGS

FIG. 2 is the same view as FIG. 1 of a method of sorting articles using a positive displacement sorter according to an embodiment of the invention.

DESCRIPTION OF THE PREFERRED EMBODIMENT

Figure 1:
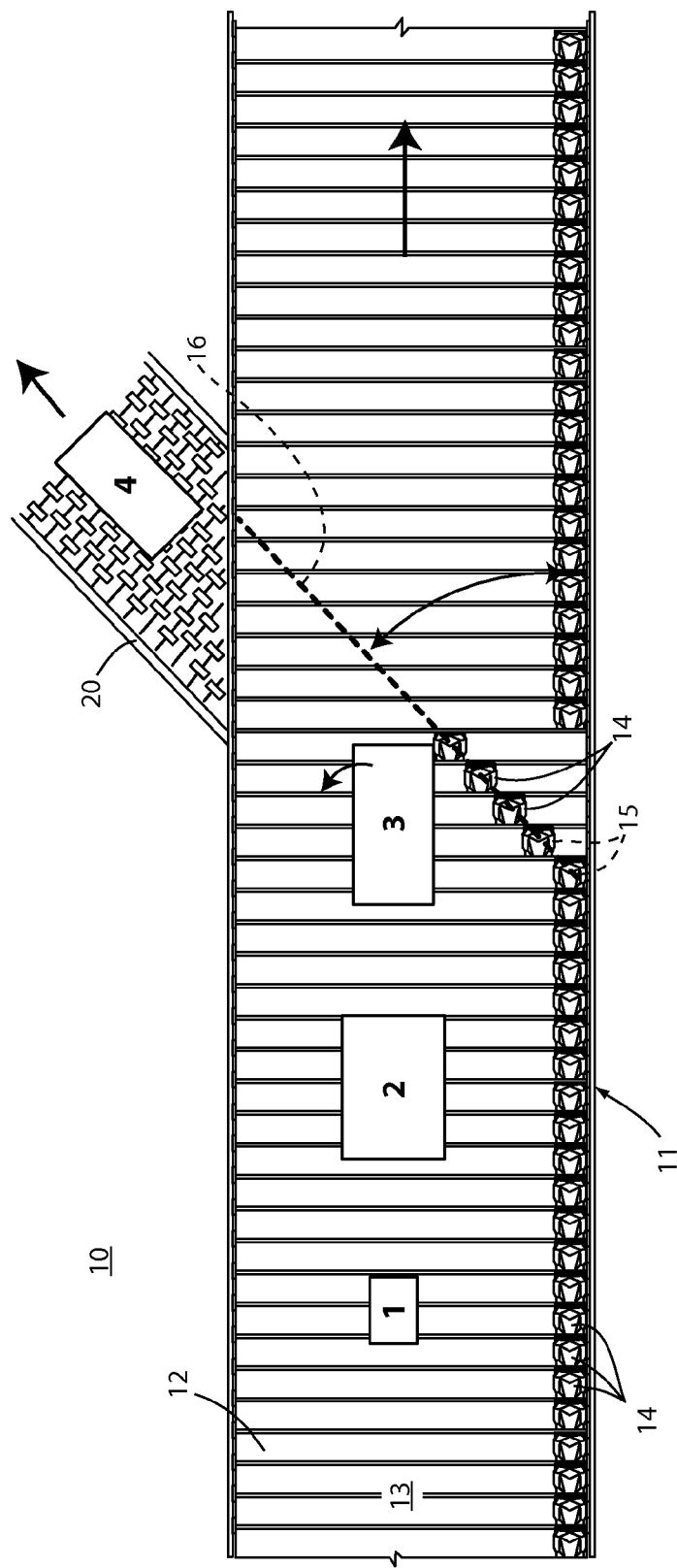
FIG. 1 is a top plan view of a method of sorting articles using a positive displacement sorter according to the prior art.

Referring now to the drawings and the illustrative embodiments depicted therein, a method 10 of sorting articles according to the prior art uses a positive displacement sorter 11 having a plurality of slats 12 that are arranged in parallel to define a conveying surface 13 moving in a longitudinal direction (FIG. 1). A plurality of pusher shoes 14 travels laterally along at least one of slats 12. A diverting station 15 includes at least one diverting rail 16 that is arranged diagonally under conveying surface 13 and at least one diverting switch that is selectively operable to divert two or more pusher shoes to diverting rail 16. Both the diverting switch and rail are located under slats 12. In this manner, the diverted two pusher shoes travel laterally across conveying surface 13 in a diagonal path at an angle defined by the angle of diverting rail 16 in order to divert an article to a take-away lane 20. An example of such a sorter and method are disclosed in U.S. Pat. No. 5,127,510, the disclosure of which is hereby incorporated herein by reference.

As can be seen in FIG. 1, articles numbered 1, 2 and 3 are generally oriented parallel to, or aligned with, the longitudinal direction of sorter 11, or the direction of motion of conveying surface 13. When one of the articles, such as article 3, is to be diverted to take-away lane 20, the diverting switch of diverting station 15 is actuated to divert a number of pusher shoes onto diverting rail 16, with the number of pusher shoes typically determined by the length of article 3. As the diverted pusher shoes travel diagonally across conveying surface 13, they make contact from a leading edge of article 3. The problem with the prior art system is that the striking of the article at a leading edge tends to impart a rotational moment on the article in the direction opposite to motion of the conveying surface, causing the article to rotate backwards, which can cause the article to enter the takeaway lane incorrectly. In the extreme, it is possible that the backwards rotation of the article may cause it to strike the article behind the article being diverted.

A method 110 of sorting articles, according to an embodiment of the invention, uses a positive displacement sorter 111 having a plurality of slats 112 that are arranged in parallel to define a conveying surface 113 moving in a longitudinal direction (FIG. 2). A plurality of pusher shoes 114 travels laterally along at least one of slats 112 when diverted to at least one diverting rail 116 arranged diagonally under conveying surface 113. A divert station 115 including at least one diverting switch that is selectively operable to divert two or more pusher shoes to diverting rail 116. Divert station 115 and diverting rail 116 are below slats 112. In this manner, the diverted two pusher shoes 114 travel laterally across conveying surface 113 in a diagonal path at an angle defined by the angle of diverting rail 116 in order to divert an article to a take-away lane 120.

Articles travelling on conveying surface 113 are oriented at 122 prior to diverting station 115. At least one side of each article is oriented in a different orientation at an angle to the longitudinal direction of travel to the conveying surface. In this manner, when a diverting switch of diverting station 115 is activated, the article is already oriented at a different orientation. The pre-angling of the article allows shoes 114 to engage the article in a way that reduces imparted rotational momentum. The articles can be pre-angled with a leading side of each article oriented to the orientation of the diverting path. This allows all or most of the pusher shoes used to divert the article to engage the article at the same time with little or no rotational moment imparted to the article. Article handling is improved and the article will be better aligned with the take-away lane 120 which is aligned with the angle of divert.

Conveying surface 113 may include the surface of sorter 111 and the conveyor (not shown) feeding the sorter. The orienting may be carried out prior to articles arriving on the sorter. The orienting may include orienting a side of each article at an angle to the longitudinal direction that is up to and including the same angle as the angle of the diagonal path.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A method of sorting articles using a positive displacement sorter having a plurality of slats arranged in parallel to define a conveying surface moving in a longitudinal direction, a plurality of pusher shoes, each of said shoes travelling laterally along at least one of said slat, at least one diverting rail arranged diagonally under said conveying surface and at least one diverting station upstream of the diverting rail for selectively diverting at least two pusher shoes to said at least one diverting rail, whereby said at least two pusher shoes travel laterally across said conveying surface in a diagonal path when diverted to said at least one diverting rail by said at least one diverting station in order to divert an article to a take-away lane, said method comprising:
pre-orienting articles prior to the articles arriving at said diverting station wherein a side of each pre-oriented article is oriented at an orientation that is at an angle to said longitudinal direction when the articles reach the diverting station; and
operating said at least one diverting station causing said pusher shoes to engage the side of a pre-oriented article and diverting the pre-oriented article without substantial further rotation of that article.

2. The method as claimed in claim 1 wherein said pre-orienting comprises changing orientation of articles from an initial orientation wherein said at least one side of each article is oriented in said longitudinal direction to the different orientation.

3. The method as claimed in claim 2 wherein said conveying surface includes a conveyor supplying articles to said sorter and where said pre-orienting is carried out prior to articles arriving on said sorter.

4. The method as claimed in claim 3 wherein said pre-orienting includes orienting said at least one side of each article at an angle to the longitudinal direction that is approximately a same angle as said diagonal path.

5. The method as claimed in claim 2 wherein said pre-orienting includes orienting said at least one side of each article at an angle to the longitudinal direction that is approximately a same angle as said diagonal path.

6. The method as claimed in claim 1 wherein said conveying surface includes a conveyor supplying articles to said sorter and where said pre-orienting is carried out prior to articles arriving on said sorter.

7. The method as claimed in claim 6 wherein said pre-orienting includes orienting said at least one side of each article at an angle to the longitudinal direction that is approximately a same angle as said diagonal path.

8. The method as claimed in claim 1 wherein said pre-orienting includes orienting said at least one side of each article at an angle to the longitudinal direction that is approximately a same angle as said diagonal path.

9. A method of sorting articles using a positive displacement sorter having a plurality of slats arranged in parallel to define a conveying surface moving in a longitudinal direction, a plurality of pusher shoes, each of said shoes travelling laterally along at least one of said slat and a diverting station, at least one diverting rail arranged diagonally under said conveying surface and at least one diverting station upstream of the diverting rail for selectively diverting at least two pusher shoes to said at least one diverting rail, whereby said at least two pusher shoes travel laterally across said conveying surface in a diagonal path when diverted to said at least one diverting rail by said at least one diverting station in order to divert an article to a take-away lane, said method comprising:
pre-orienting articles prior to the articles arriving at said diverting station wherein a side of each pre-oriented article is oriented at approximately a same orientation as said diagonal path; and
operating said at least one diverting station and diverting the pre-oriented article without substantial further rotation of that article.

10. The method as claimed in claim 9 wherein said pre-orienting comprises changing orientation of articles from an initial orientation wherein said at least one side of each article is oriented in said longitudinal direction to the different orientation.

11. The method as claimed in claim 10 wherein said conveying surface includes a conveyor supplying articles to said sorter and where said pre-orienting is carried out prior to articles arriving on said sorter.

12. The method as claimed in claim 11 wherein said pre-orienting includes orienting said at least one side of each article at an angle to the longitudinal direction that is approximately a same angle as said diagonal path.

13. The method as claimed in claim 11 wherein said pre-orienting includes orienting said at least one side of each article at an angle to the longitudinal direction that is approximately a same angle as said diagonal path.

14. The method as claimed in claim 9 wherein said conveying surface includes a conveyor supplying articles to said sorter and where said pre-orienting is carried out prior to articles arriving on said sorter.

15. The method as claimed in claim 14 wherein said pre-orienting includes orienting said at least one side of each article at an angle to the longitudinal direction that is approximately a same angle as said diagonal path.

16. The method as claimed in claim 9 wherein said pre-orienting includes orienting said at least one side of each article at an angle to the longitudinal direction that is approximately a same angle as said diagonal path.

* * * * *